(12) United States Patent
Yun

(10) Patent No.: US 6,721,418 B1
(45) Date of Patent: Apr. 13, 2004

(54) AUTOMATIC DIALING METHOD IN TELEPHONE TERMINAL

(75) Inventor: Sung-Hm Yun, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/338,475

(22) Filed: Jun. 22, 1999

(30) Foreign Application Priority Data

Jun. 22, 1998 (KR) .......................................... 1998-23426

(51) Int. Cl.[7] .............................. H04M 1/00; H04M 3/00
(52) U.S. Cl. ............................ 379/355.01; 379/355.05; 379/355.06; 379/355.02; 455/564
(58) Field of Search ................... 379/355.01, 355.03, 379/355.05–355.1, 356.01, 355.08, 355.09; 455/564

(56) References Cited

U.S. PATENT DOCUMENTS

| 4,852,146 A | | 7/1989 | Hathcock et al. |
| 5,422,945 A | | 6/1995 | Wyatt |
| 5,732,132 A | * | 3/1998 | Hamada |
| 5,963,875 A | * | 10/1999 | Go |
| 6,035,220 A | * | 3/2000 | Claudio et al. |
| 6,453,178 B1 | * | 9/2002 | Zicker et al. |
| 6,473,610 B1 | * | 10/2002 | Nilsson |

FOREIGN PATENT DOCUMENTS

CN 1141709 A 1/1997

OTHER PUBLICATIONS

First Office Action of Patent Office of People's Republic of China (dated Dec. 6, 2002) (5 pages) with translation into English language (10 pages).

* cited by examiner

Primary Examiner—Duc Nguyen
(74) Attorney, Agent, or Firm—Dilworth & Barrese LLP

(57) ABSTRACT

An automatic dialing method in a telephone terminal. In the method, digit keys are entered from a user, the call type and digit number requirement for a telephone number that the input digit keys represent are determined upon absence of input of a SEND key, and the telephone number is dialled if the input digit keys are complete, or after a predetermined standby time if the input digit keys are incomplete.

9 Claims, 3 Drawing Sheets

AUTOMATIC DIALING METHOD IN TELEPHONE TERMINAL

CLAIM OF PRIORITY

This application makes reference to, incorporates the same herein, and claims all benefits accruing under 35 U.S.C. §119 from an application entitled AUTOMATIC DIALING METHOD IN TELEPHONE TERMINAL earlier filed in the Korean Industrial Property Office on Jun. 22, 1998, and there duly assigned Serial No. 98-23426.

BACKGROUND OF THE INVENTION

1. Field of the Invention

The present invention pertains to telephone equipment art and, more particularly, to a method of automatically dialing a telephone number without the need to input a SEND key, in a telephone terminal.

2. Description of the Related Art

For a conventional telephone terminal such as a wireless local loop (WLL) telephone or a mobile telephone, one of two dialing methods are used to dial a telephone number corresponding to input digit keys only upon input of the SEND key.

The first method requires the input of digit keys followed by a SEND key input. The second method automatically dials a telephone number corresponding to the input digit keys after a predetermined time period has elapsed. The former method inconveniences a user to select the SEND key for dialing. The second method is deficient in that it is impossible to complete a normal call if the input digit keys form an incomplete telephone number. For example, entering only six digits where seven are required.

SUMMARY OF THE INVENTION

The present invention provides an automatic dialing method in a telephone terminal. In accordance with the method of the present invention, digit keys are entered from a user. In the absence of a SEND key input, the telephone number is immediately dialed if it is determined from a table reference that the input digit keys are complete. Otherwise, the number is dialled after a predetermined standby time if it is determined that the input digit keys are incomplete. In the case where the telephone number is determined to be incomplete, the internal input table is referenced to determine a call type and associated digital number requirement corresponding to the input digit keys to match the incomplete number (i.e., input digit keys) to a complete number stored in the table.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

A description of the present invention is provided with an understanding that it is applicable to other terminals capable of dialing in addition to the telephone terminal described herein. The telephone terminal is intended only to clarify some of the concepts, features, and objects of the invention, and do not define the scope of the invention.

Figure 1:
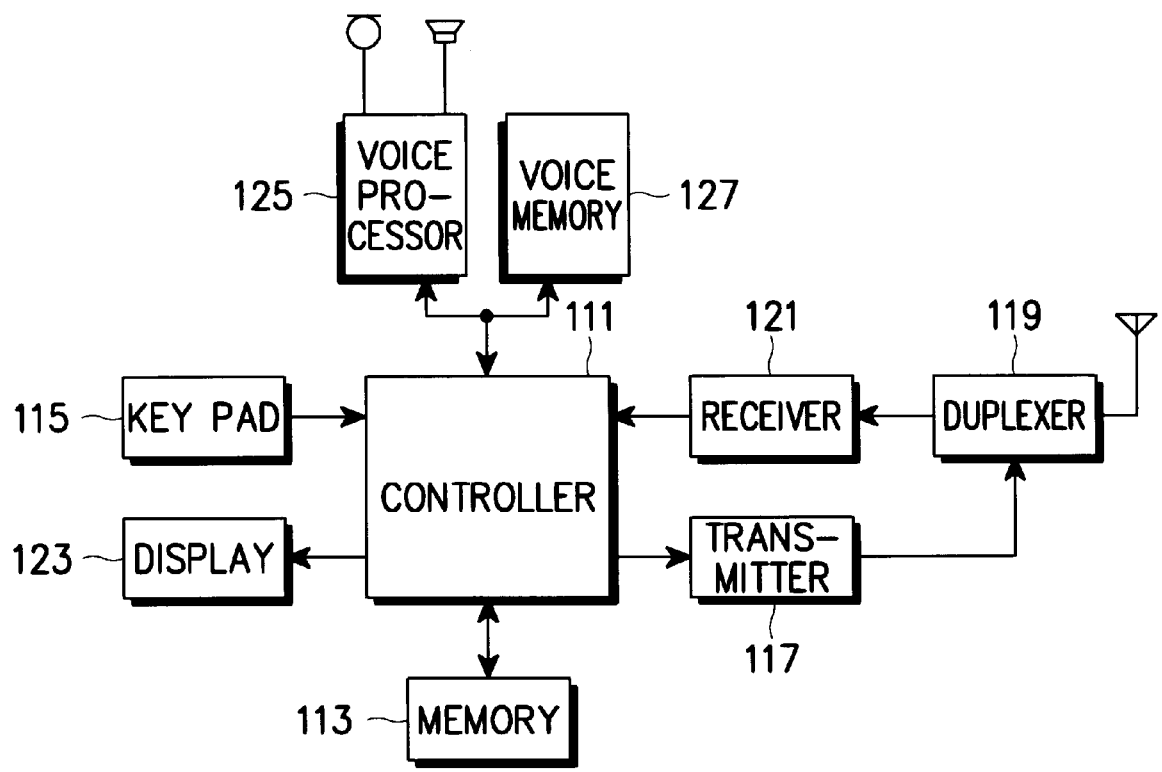
FIG. 1 is a schematic block diagram showing the structure of a telephone terminal according to the present invention.

FIG. 1 shows a schematic block diagram of a telephone terminal according to the present invention. As is shown, a controller 111 provides an overall control to a telephone terminal. A memory 113 stores a control program needed for the operation of the telephone terminal and temporary data generated from the control operation of the controller 111. In particular, the memory 113 stores a table where call types, the number of digits required for each call, and a standby time assigned for each call are listed. The table also stores a count value of input digit keys.

The key pad 115, having a SEND key and a plurality of digit keys, generates a key signal corresponding to a key selected by a user and provides a controller 111 with the key signal corresponding to a key selected by the user. Then, the controller 111 determines whether the key signal received from the key pad 115 is a digit key signal or a SEND key signal. If it is a digit key signal, the controller 111 reads the table from the memory 113 and determines whether the digit keys input to that point represents a complete telephone number on the basis of the call type and digit number requirements stored in the table. If the telephone number is complete, for example, 02-222-2222, the controller 111 feeds the received digit key signal to a transmitter 117. The transmitter 117 modulates the digit key signal received from the controller 111 to a corresponding dialing signal. A duplexer 119 sends the dialing signal received from the transmitter 117 through an antenna or feeds a signal received from the antenna to a receiver 121. The receiver 121 demodulates the signal received from the duplexer 119, and then the controller 111 operates in response to the signal received from the receiver 121.

On the other hand, if the controller determines that the telephone number is incomplete, for example, 02-222-222, the controller 111 sets a standby time in the table of the memory 113. That is, the table of the memory 113 also includes a standby time set according to the number of digit keys inputted. If the standby time has not elapsed, the controller 111 determines whether another digit key is entered from the key pad 115. Upon the absence of the input of another digit key, the controller 111 displays an INVALID message on a display 123. The display 123 may be an LCD (Liquid Crystal Display) and serves to display the operational status of the telephone terminal and input digits.

A voice processor 125 digitally processes a voice signal received through a microphone and converts the received voice message for storage in a voice memory 127 to an analog signal. The voice memory 127 stores a voice message received from the voice processor 125.

Figure 2:
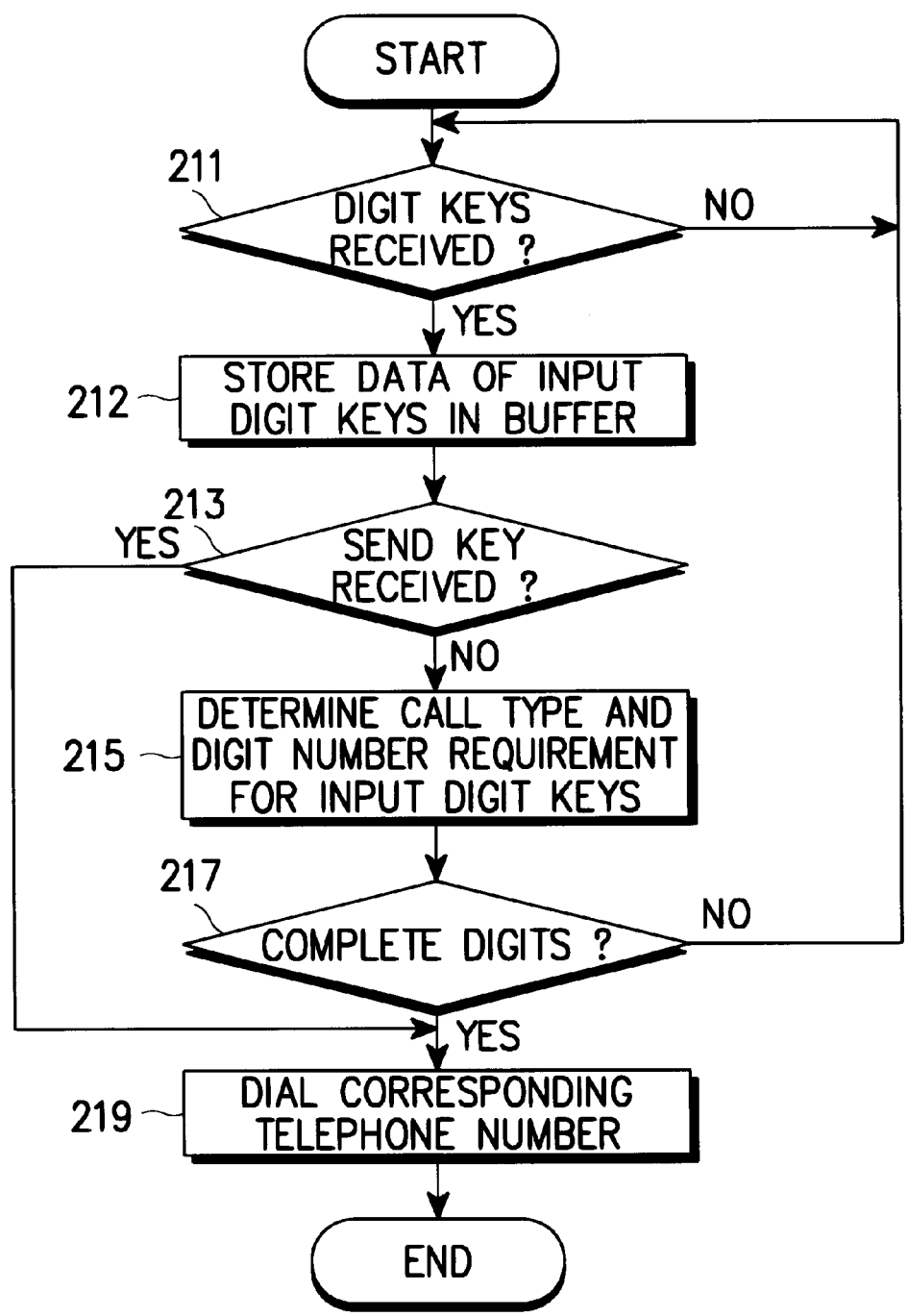
FIG. 2 is a flowchart of a first embodiment of the method of the present invention.

Turning to FIG. 2, a flowchart illustrating the method of the present invention describing automatic dialing based on the call type and number of input digit keys.

Referring to FIG. 2, when the telephone terminal of FIG. 1 is activated, the controller 111 is initialized. In step 211, the controller 111 detects the key signal selected by a user from the key pad 115. Upon input of one or more digit keys, for example, 02-222-2222, the controller 111 stores information on the input digit keys in a buffer of the memory 113, in step 212. In step 213, the controller 111 determines in a predetermined period whether the SEND key for dialing a telephone number that the input digit keys represent is input from the key pad 115. Upon input of the SEND key, the controller 111 goes to step 219.

Upon absence of the SEND key input, the controller 111 determines the call type and associated digit number requirement of the input digit keys from the table of the memory 113, in step 215. Call types include an international call, a long distance call, a local telephone call, a mobile telephone call, and a pager call. A different number of digits are assigned for each call. In the case of a telephone number including an area code, a telephone office code, and a subscriber code, two, three, or four digits can be assigned to the area code, and three or four digits can be assigned to the telephone office code. In step 217, the controller 111 determines whether the input digit keys form a complete telephone number by comparing the area code or the telephone office code with the call type and digit number requirement in the table of the memory 113. In the case of an incomplete telephone number, say, 02-222-222, the controller 111 determines that another digit key is yet to be input to complete the subscriber code in the telephone number and returns to step 211. That is, because the telephone terminal is set to a standby mode for receiving digit keys, the controller 111 awaits input of another digit key following the input digit keys.

On the other hand, in the case of a complete telephone number, say, 02-222-2222, the controller 111 feeds a digit key signal corresponding to the input digit keys to the transmitter 117, in step 219. The transmitter 117 modulates the digit key signal received from the controller 111 to a corresponding dialing signal. The duplexer 119 sends the dialing signal received from the transmitter 117.

Therefore, the automatic dialing method of the present invention, illustrated in FIG. 2, is performed by comparing the number and structure of input digit keys with reference to the table of the memory, which includes a variety of call types and their associated digit number requirements.

Figure 3:
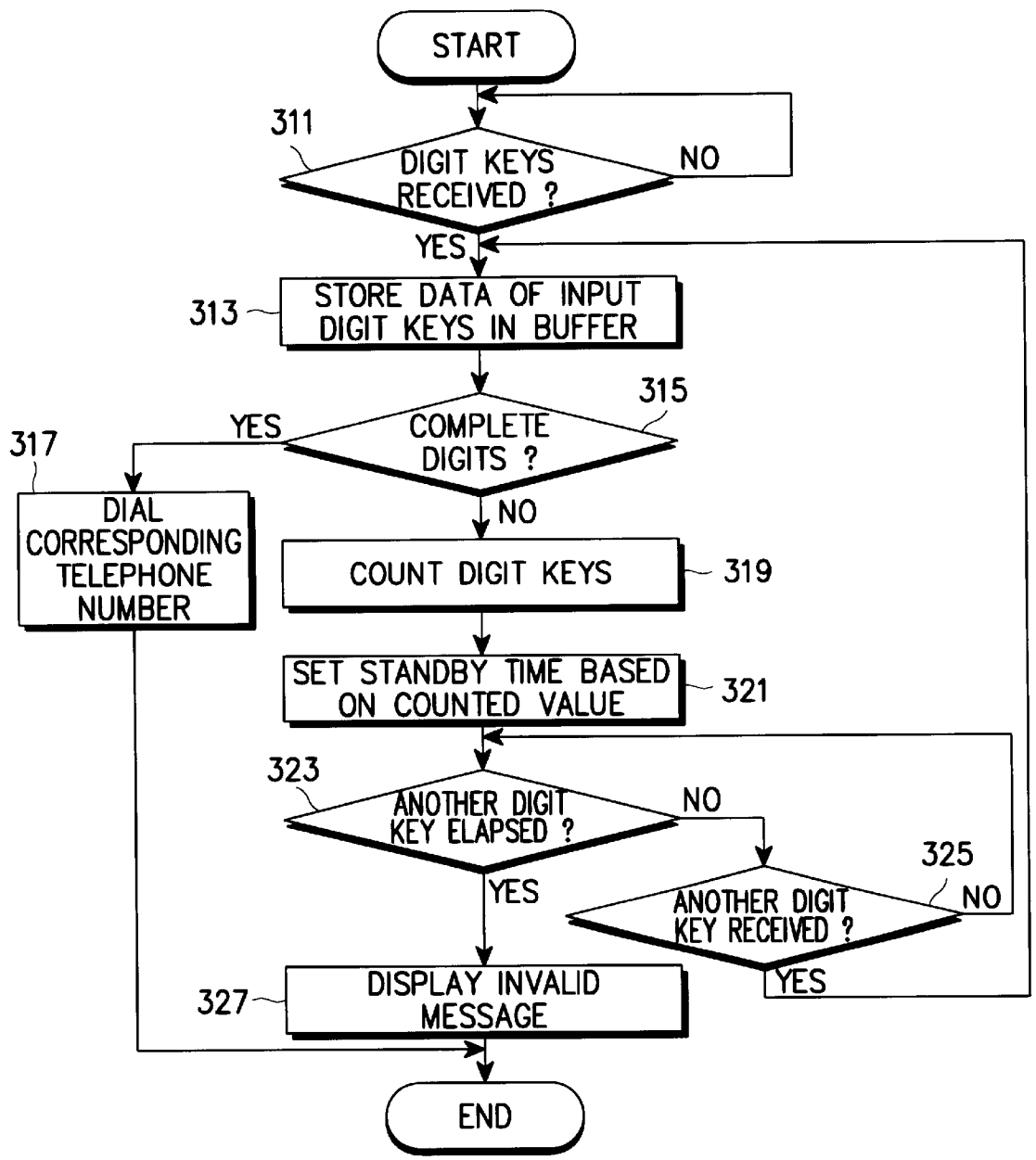
FIG. 3 is a flowchart of a second embodiment of the method of the present invention.

FIG. 3 is a flowchart of an automatic dialing method according to another embodiment of the present invention, in which a unique standby time is set according to the call type and number of input digit keys.

Referring to FIG. 3, when the telephone terminal of FIG. 1 is activated, the controller 111 is initialized. In step 311, the controller 111 detects the key signal selected by a user from the key pad 115. Upon input of digit keys, the controller 111 stores information on the input digit keys in a buffer of the memory 113, in step 313. In step 315, the controller 111 reads from the table of the memory 113 the call type, digit number requirement, and standby time for a telephone number that the input digit keys represent, and determines whether the input digit keys represent a complete or incomplete telephone number according to the information read from the table. It is important to note that a distinguishing feature of the present invention is the inclusion of standby time information in the table of the memory 113. In the case of a complete telephone number, say, 02-222-2222, the controller 111 feeds a digit key signal corresponding to the input digit keys to the transmitter 117, in step 317. The transmitter 117 modulates the digit key signal received from the controller 111 to a corresponding dialing signal. The duplexer 119 sends the dialing signal received from the transmitter 117.

In the case of an incomplete telephone number, say -02- for example, the controller 111 determines that seven or more digit keys such as 222-2222 are yet to be input to complete the telephone number and goes to step 319. In step 319, the controller 111 obtains the counted value of the input digits from the memory 113. In step 321, the controller 111 sets a standby time corresponding to the counted value with reference to the table of the memory 113. For two-digit input, for example, seven seconds are designated as a standby time, and for a three-digit input, a six-second standby time is set. That is, a shorter standby time is assigned in inverse proportion to the number of input digits already received. In step 323, the controller 111 determines whether the designated standby time has elapsed. If the standby time has not elapsed, the controller 111 determines whether another digit key is input from the key pad 115, in step 325. Upon the absence of another key input, the controller 111 returns to step 323. Upon input of another key input, the controller 111 returns to step 313.

If the standby time has elapsed in step 323, the controller 111 displays a message INVALID on the display 123 in step 327.

Therefore, the automatic dialing method of FIG. 3 sets a standby time for another digit key input on the basis of the counted value of input digit keys and the table including the call type, digit number requirement, and standby time for a telephone number that the input digit keys represent in the memory.

According to the present invention as described above, a telephone number is automatically dialled based on the number of input digit keys with reference to the information on the call type, digit number requirement, and standby time for the telephone number that the input digit keys represent, in a telephone terminal. As a result, a user is relieved of the inconvenience of entering digit keys again, which is caused by the conventional unreliable automatic dialing, and further an accurate dialing is achieved.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. An automatic dialing method in a communication terminal, comprising the steps of:
   (i.) receiving digit keys from a user and setting a predetermined standby time corresponding to the number of received digit keys;
   (ii.) determining if a SEND key is input from the user in the predetermined standby time;
   (iii.) dialing a telephone number corresponding to the received digit keys if the SEND key was input at step (ii.) in the predetermined standby time;
   (iv.) determining whether the received digit keys represent a complete or partial telephone number if the SEND key was not input at step (ii.) in the predetermined standby time; and
   (v.) based on the determination of step (iv.), automatically dialing the complete telephone number if the received digit keys represent the complete telephone number, otherwise displaying an INVALID message and returning to a standby mode without dialing.

2. The automatic dialing method of claim 1, wherein the received digit keys are stored in a memory upon reception.

3. The automatic dialing method of claim 2, wherein the step of determining whether the received digit keys represent the complete or partial telephone number include comparing the received digit keys with a plurality of call types and associated digit number requirements for said call types.

4. The automatic dialing method of claim 3, wherein the plurality of call types and associated digit number requirements are pre-stored in a look-up table.

5. The automatic dialing method of claim 3, wherein the call type is one of an international call, a long distance call, a local telephone call, a mobile telephone call, and a pager call.

6. An automatic dialing method in a telephone terminal, comprising the steps of:

(i) receiving digit keys from a user and setting a predetermined standby time corresponding to the number of received digit keys;

(ii) determining a call type and a digit number requirement for a telephone number that the input digit keys represent upon absence of input of a SEND key;

(iii) dialing the telephone number if the input digit keys are complete; and (iv) determining and dialing the telephone number after the predetermined standby time if the input digit keys are incomplete.

7. The automatic dialing method of claim 6, wherein the call type and the digit number requirement for the telephone number that the input digit keys represent are determined from a table prepared in a memory of the telephone terminal.

8. The automatic dialing method of claim 7, wherein the table stores the call type, the digit number requirement, and the predetermined standby time for a telephone number that the input digit keys represent.

9. The automatic dialing method of claim 6, further comprises the steps of:

decreasing the predetermined standby time as additional digit keys are input;

temporarily storing the counted value of the input digit keys in a buffer;

determining whether the predetermined standby time has elapsed; and displaying a message INVALID on a display of the telephone terminal if the standby time has elapsed.

* * * * *